(12) United States Patent
Ordonez

(10) Patent No.: US 8,185,547 B1
(45) Date of Patent: May 22, 2012

(54) DATA ANALYSIS BASED ON MANIPULATION OF LARGE MATRICES ON A PERSISTENT STORAGE MEDIUM

(75) Inventor: Carlos Ordonez, San Diego, CA (US)

(73) Assignee: Teradata US, Inc., Dayton, OH (US)

( * ) Notice: Subject to any disclaimer, the term of this patent is extended or adjusted under 35 U.S.C. 154(b) by 1789 days.

(21) Appl. No.: 11/193,679

(22) Filed: Jul. 29, 2005

(51) Int. Cl.
*G06F 7/00* (2006.01)
*G06F 17/30* (2006.01)
*G06F 13/14* (2006.01)

(52) U.S. Cl. .......... 707/781; 707/705
(58) Field of Classification Search ............ 707/1, 2, 707/6, 9, 100, 101, 102, 104.1, 781
See application file for complete search history.

(56) References Cited

U.S. PATENT DOCUMENTS

| | | | |
|---|---|---|---|
| 6,263,337 B1 * | 7/2001 | Fayyad et al. | 1/1 |
| 6,581,058 B1 * | 6/2003 | Fayyad et al. | 707/737 |
| 6,636,862 B2 * | 10/2003 | Lundahl et al. | 1/1 |
| 6,735,589 B2 * | 5/2004 | Bradley et al. | 1/1 |
| 7,174,048 B2 * | 2/2007 | Glickman et al. | 382/260 |
| 2004/0078367 A1 * | 4/2004 | Anderson et al. | 707/3 |

OTHER PUBLICATIONS

C. Ordonez, U.S. Appl. No. 10/838,475, "Method and Apparatus to Cluster Binary Data Transactions," filed May 4, 2004, pp. 1-26, Figs. 1-3.
C. Ordonez, U.S. Appl. No. 11/129,732, "K-Means Clustering Using Structured Query Language Statements," filed May 13, 2005, pp. 1-23, Figs. 1-2.
C. Aggarwal et al., "Finding Generalized Projected Clusters in High Dimensional Spaces," ACM SIGMOD Conference, pp. 70-81, 2000.
C. Aggarwal et al., "Outlier Detection for High Dimensional Data," ACM SIGMOD Conference, pp. 40-51, 2001.
R. Agrawal et al., "Automatic Subspace Clustering of High Dimensional Data for Data Mining Applications," ACM SIGMOD Conference, pp. 94-105, 1998.
R. Agrawal et al., "Mining Association Rules Between Sets of Items in Large Database," ACM SIGMOD Conference, pp. 207-216, 1993.
R. Agrawal et al., "Fast Algorithms for Mining Association Rules," VLDB Conference, pp. 487-499, 1994.
P. Bradley et al., "Scaling Clustering Algorithms to Large Databases, ACM KDD Conference," pp. 9-15, 1998.
P. Bradley et al., "Scaling EM (Expectation-Maximization) Clustering to Large Databases," Techical Report, Microsoft Research, 1999.
M. Breunig et al., "Data Bubbles: Quality Preserving Performance Boosting for Hierarchical Clustering," ACM SIGMOD Conference, pp. 102-113, 2001.
S. Chaudhuri et al., "Rethinking Database System Architecture: Towards a Self-Tuning RISC-Style Database System," VLDB Conference, pp. 1-10, 2000.

(Continued)

*Primary Examiner* — Cam-Y Truong
*Assistant Examiner* — Cecile Vo
(74) *Attorney, Agent, or Firm* — Trop, Pruner & Hu P.C.

(57) ABSTRACT

Matrices involved in a data analysis are stored in predetermined blocks, where blocks for a first matrix contain respective rows of the first matrix, and blocks for a second matrix contain respective columns of the second matrix. Results for the data analysis are computed using the blocks of the first and second matrices.

23 Claims, 4 Drawing Sheets

OTHER PUBLICATIONS

A.P. Dempster et al., "Maximum Likelihood Estimation from Incomplete Data Via the EM Algorithm," Journal of the Royal Statistical Society, 39(1):1-38, 1977.

F. Farnstrom et al., "Scalability for Clustering Algorithms Revisited," SIGKDD Explorations, 2(1):51-57, Jun. 2000.

U. Fayyad et al., "The KDD Process for Extracting Useful Knowledge from Volumes of Data," Communications of the ACM, 39(11):27-34, Nov. 1996.

B. Fritzke, "The LBG-U Method for Vector Quantization—An Improvement Over LBG Inspired from Neural Networks," Neural Processing Letters, 5(1):35-45, 1997.

V. Ganti et al., "CACTUS—Clustering Categorical Data Using Summaries," ACM KDD Conference, pp. 73-83, 1999.

S. Guha et al., "CURE: An Efficient Clustering Algorithm for Large Databases," SIGMOD Conference, pp. 73-84, 1998.

S. Guha et al., "ROCK: A Robust Clustering Algorithm for Categorical Attributes," ICDE Conference, pp. 512-521, 1999.

J. Han et al., "Mining Frequent Patterns Without Candidate Generation," ACM SIGMOD Conference, pp. 1-12, 2000.

A. Hinneburg et al., "Optimal Grid-Clustering: Towards Breaking the Curse of Dimensionality in High Dimensional Clustering," VLDB Conference, pp. 506-517, 1999.

Z. Huang, "Extensions to the K-Means Algorithm for Clustering Large Data Sets with Categorical Values," Data Mining and Knowledge Discovery, 2(3):283-304, 1998.

M.I. Jordan et al., "Hierarchical Mixtures of Experts and the EM Algorithm," Neural Computation, 6(2):181-214, 1994.

A. Nanopoulos et al., "C2P: Clustering Based on Closest Pairs," VLDB Conference, pp. 331-340, 2001.

R. Neal et al, "A View of the EM Algorithm that Justifies Incremental, Sparse, and Other Variants," Technical Report, Dept. of Statistics, Univ. of Toronto, pp. 1-14, 1993.

R. Ng et al., "Efficient and Effective Clustering Methods for Spatial Data Mining," VLDB Conference, pp. 144-155, 1994.

C. Ordonez, "Clustering Binary Data Streams with K-Means," ACM DMKD Workshop, pp. 10-17, 2003.

C. Ordonez et al., "SQLEM: Fast Clustering in SQL Using the EM Algorithm," ACM SIGMOD Conference, pp. 559-570, 2000.

C. Ordonez et al., "FREM: Fast and Robust EM Clustering for Large Data Sets," ACM CIKM Conference, pp. 590-599, 2002.

D. Pelleg et al., "Accelerating Exact K-Means Algorithms with Geometric Reasoning," ACM KDD Conference, pp. 277-281, 1999.

S. Roweis et al., "A Unifying Review of Linear Gaussian Models," Neural Computation, 11:305-345, 1999.

S. Sarawagi et al., "Integrating Association Rule Mining with Relational Database Systems: Alternatives and Implications," ACM SIGMOD Conference, 1998.

N. Ueda et al., "SMEM Algorithm for Mixture Models," Neural Information Processing System, pp. 1-24, 1998.

L. Xu et al., "On Convergence Properties of the EM Algorithm for Gaussian Mixtures," Neural Computation, 8(1):129-151, 1996.

T. Zhang et al., "BIRCH: An Efficient Data Clustering Method for Very Large Databases," ACM SIGMOD Conference, pp. 103-114, 1996.

C. Ordonez, "Fast K-Means Clsutering in SQL Based on Improved Distance Computation and Sufficient Statistics," pp. 1-11, 2004.

C. Ordonez et al., "A Fast Algorithm to Cluster High Dimensional Basket Data," pp. 1-4, 2001.

* cited by examiner

Input: $D$ and $k$.
Output: $C$, $R$, $W$ and a partition $D_1, D_2, ..., D_k$

```
Initialize()                                           ← 300
    I = 0
WHILE I ≤ MAXITERS and q[I] − q[I−1] ≤ ε DO  ⎫
    I = I + 1                                          ⎪
    FOR i = 1 TO n DO                                  ⎪
        Estep()                                        ⎬ 306
    END                                                ⎪
    Mstep()                                            ⎪
END                                                    ⎭

Estep()                                                ⎫
    δ ← Δ                                              ⎪
    xli ← readRow(D)                                   ⎪
    i ← D.PID, l ← D.l                                 ⎪
    WHILE D.PID = i DO                                 ⎪
        Cblock ← read(C,l)                             ⎪
        Rblock ← read(R,l)                             ⎪
        FOR j=1 TO k DO                                ⎪
            δj = δj + ( Xlz − Cblockj)² − Cblockj²     ⎪
        END                                            ⎬ 302
        xli ← readRow(D)                               ⎪
        i ← D.PID, l ← D.l                             ⎪
    END                                                ⎪
    Let m be s.t. δm ≤ δj, j = 1, ..., k               ⎪
    Nm = Nm + 1                                        ⎪
    Mblock ← read(M, m)                                ⎪
    Mblock ← Mblock + xi, write(Mblock, M, m)          ⎪
    Qblock ← read(Q, m)                                ⎪
    Qblock ← Qblock + xixiᵀ, write(Qblock, Q, m)       ⎪
    write({i,m},P)                                     ⎭

Mstep()                                                ⎫
    FOR j = 1 TO k DO                                  ⎪
        Mblock ← read(M, j)                            ⎪
        Qblock ← read(Q, j)                            ⎪
        FOR l = 1 TO d DO                              ⎪
            IF Nj > 1 THEN                             ⎪
                Cblock ← read(C,l)                     ⎪
                Cblockj ← Mblockl/Nj                   ⎪
                write(Cblock, C, l)                    ⎬ 304
                Rblock ← read(R, l)                    ⎪
                Rblockj ← Qblockl/Nj + (Mblockl/Nj)²   ⎪
                write(Rblock, R, l)                    ⎪
            END                                        ⎪
        END                                            ⎪
        Wblockj ← Nj/|N|                               ⎪
    END                                                ⎪
    FOR j = 1 TO k DO Δj ← δ(0̄, Cj) END               ⎪
    write(Wblock, W, 1)                                ⎭
```

| PID | I | value |
|-----|---|-------|
| 1 | 1 | 5 |
| 1 | 2 | 2 |
| 1 | 3 | 1 |
| 2 | 1 | 5 |
| 2 | 2 | 2 |
| 2 | 3 | 1 |
| 3 | 1 | 3 |
| 3 | 2 | 6 |
| 3 | 3 | 9 |
| 4 | 1 | 3 |
| 4 | 2 | 6 |
| 4 | 3 | 9 |

400

$C =$

| I | block contents |
|---|----------------|
| 1 | 5 3 |
| 2 | 2 6 |
| 3 | 1 9 |

402

$W =$

| Key | block contents |
|-----|----------------|
| -   | 0.5  0.5 |

404

DATA ANALYSIS BASED ON MANIPULATION OF LARGE MATRICES ON A PERSISTENT STORAGE MEDIUM

BACKGROUND

Database management systems are used to store data for convenient access by users. An application of database management systems is data warehousing, where data from various sources are collected and stored in a data warehouse.

For better understanding of data stored in a database (such as a data warehouse), data analysis is performed on data stored in the database. Examples of data analysis include data mining, machine learning, and statistical analysis. Statistical analysis usually involves the analysis of various statistics (e.g., database size, table sizes, data distribution, etc.) associated with data. A common task performed in statistical analysis is clustering, which involves segmentation, classification, and anomaly detection of data in the database.

In performing clustering, a data set is partitioned into disjoint groups such that points in the same group are similar to each other according to some similarity metric. A widely used clustering technique is K-means clustering. Clustering can be performed on numeric data or categorical data. Numerical data refers to data that is assigned a metric measure, such as height, scale, volume, and so forth. Categorical data is data that has a finite number of values not represented by a measure. Examples of categorical data include city, state, gender, and so forth.

Clustering involves assigning data points to respective clusters, with each point typically having multiple dimensions (or attributes). For example, a point may represent a visit by a customer to a store, with the dimensions corresponding to the items purchased by the customer during the visit.

Conventionally, clustering algorithms use input data sets that are organized as a plain file or table. Each line in the file or table contains a data point, and all points have exactly the same number of dimensions. Conventional formats for data sets used by clustering algorithms are typically inefficient for several reasons. First, data sets are usually originally stored in relational tables; therefore, such relational tables have to be first converted into the plain file or table format before a data set can be processed by a conventional clustering algorithm. Such conversion can be time-consuming and wasteful of system resources.

Also, some dimensions of points contained in a data set have zero value. Having to store these zero-value dimensions in a plain file or table is inefficient in terms of storage space and usage of processing resources. Moreover, for a data set that has points with a relatively large number of dimensions or for clustering that involves a large number of clusters, storage requirements can be relatively large. In such scenarios, the clustering algorithm may not work efficiently in a system that has a limited amount of memory since the memory may not have sufficient space to store clustering results as well as any intermediate data structures employed during clustering.

SUMMARY

In general, methods and apparatus are provided for performing data analysis with respect to data, including statistical analysis (e.g., clustering), data mining, or machine learning, based on manipulation of matrices, stored on a persistent storage medium, that allow for relatively fast processing and reduced usage of memory.

Other or alternative features will become apparent from the following description, from the drawings, and from the claims.

BRIEF DESCRIPTION OF THE DRAWINGS

FIG. 3 depicts pseudocode for performing clustering according to an example embodiment.

FIG. 4 illustrates example matrices used by the clustering mechanism according to an embodiment.

DETAILED DESCRIPTION

In the following description, numerous details are set forth to provide an understanding of the present invention. However, it will be understood by those skilled in the art that the present invention may be practiced without these details and that numerous variations or modifications from the described embodiments are possible.

I. Database System Environment

Figure 1:
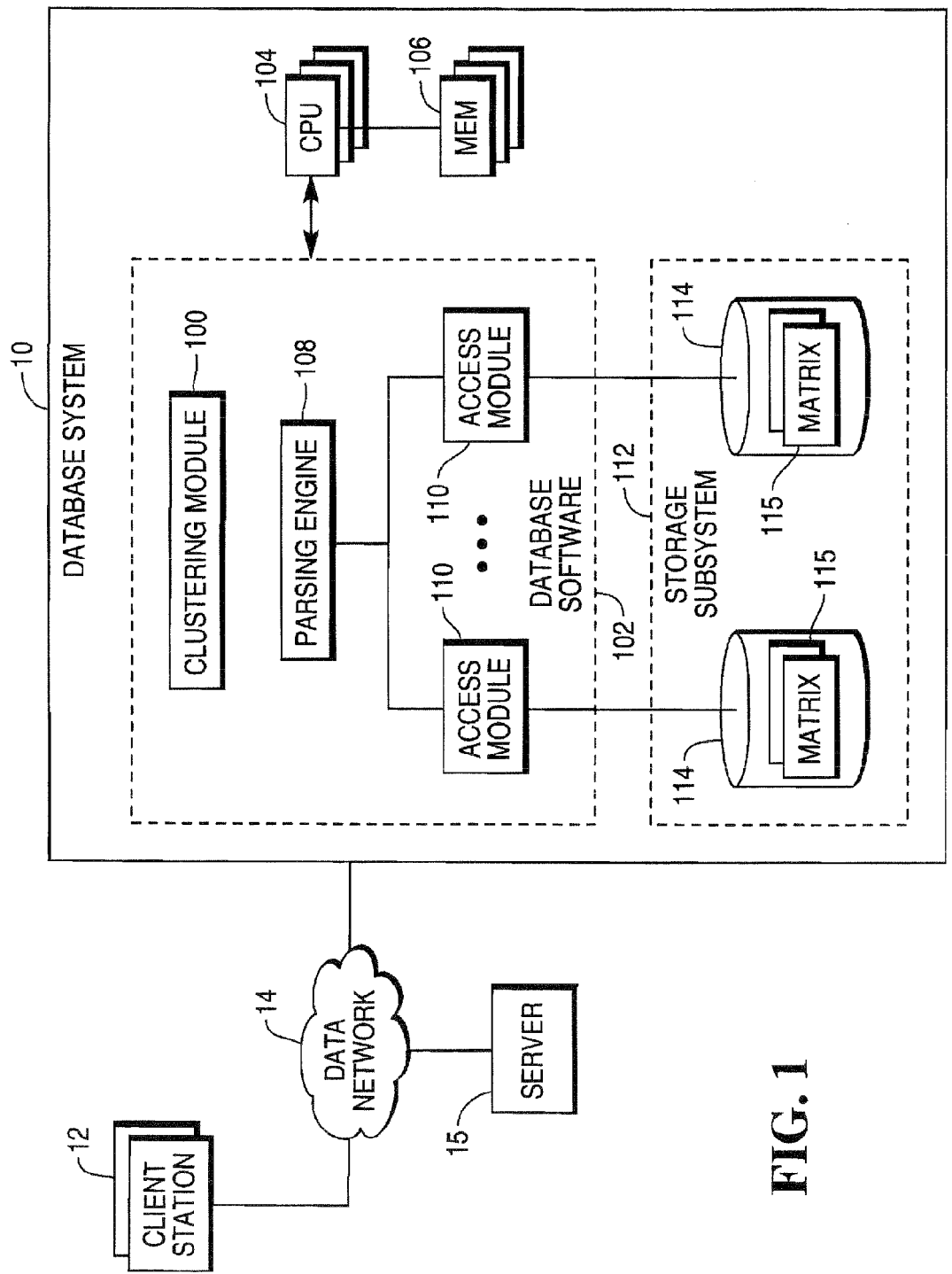
FIG. 1 is a block diagram of an example arrangement that includes a database system coupled to one or more client stations, where the database system has a clustering mechanism according to some embodiments of the invention.

FIG. 1 illustrates an example arrangement of a database system 10 (e.g., a relational database management system) that includes a clustering module 100 capable of performing clustering techniques according to some embodiments. In some implementations, the clustering techniques include K-means clustering techniques. In the ensuing description, reference is made to K-means clustering. However, it is contemplated that techniques according to some embodiments are applicable to other types of clustering techniques. Also, note that the techniques described below are also applicable to other forms of data analysis, such as other forms of statistical analysis (e.g., regression analysis, decision tree analysis, etc.), data mining, and machine learning. "Data mining" refers to analysis performed with respect to data stored in a database. "Machine learning" refers to a technique performed by a machine-learning module capable of learning based on input data or training data. A machine-learning module is trained to classify data points into plural categories. Examples of machine-learning algorithms include a support vector machine learning algorithm, Bayes network learning algorithm, a Bayesian network algorithm, a neural network learning algorithm, and a decision tree learning algorithm. In other embodiments, the clustering module 100 is replaced with a data mining module or machine-learning module to perform data mining methods or machine learning methods, respectively.

The clustering module 100, in the illustrated embodiment, is part of database software 102 that is executable on one or more central processing units (CPUs) 104 in the database system. The one or more CPUs 104 are connected to memory 106 (implemented with multiple memory devices in FIG. 1).

The clustering module 100 is invoked to cluster a data set, which can either be located in a table in the database system 10 or be provided as a flow or stream of input data to the database system 10. In one implementation, data associated with transactions are loaded by client stations 12 over a data network 14 to a server 15. The clustering module 100, when invoked, accesses the server 15 in one of several ways: by accessing disk blocks on the server directly; or by transferring data on a channel where rows are being loaded.

The database software 102 also includes one or more parsing engines 108 and access modules 110. The database system 10 in accordance with one example implementation is a parallel database system that includes multiple access modules 110 for concurrent access of data stored in a storage subsystem 112. The storage subsystem 112 includes plural storage modules 114 that are accessible by respective access modules 110. Alternatively, the database software 102 can be implemented in a sequential or uni-processor system.

According to some embodiments, the storage modules 114 are implemented with persistent storage devices. A persistent storage device is a storage device that maintains the data stored in the storage device even if power is removed from the storage device or if the system is reset or rebooted. The storage modules 114 collectively provide a persistent storage medium, which includes one or more disks (e.g., magnetic or optical disks), semiconductor storage devices, and others.

Unlike the storage modules 114, the memory 106 is implemented with higher speed storage devices (having greater access speed than the storage modules 114). The memory 106 is considered intermediate or temporary storage for storing a portion of data on the storage modules 114. Usually, the storage capacity of the memory 106 is smaller than the storage capacity of the storage modules 114. In some implementations, the memory 106 is implemented with volatile or non-persistent storage devices.

Each access module 110 is capable of performing the following tasks: insert, delete, or modify contents of tables stored in respective storage modules 114; create, modify or delete the definitions of tables; retrieve information from definitions and tables; and lock databases and tables. The clustering module 100 and other applications or users can share the same set of tables. In one example, the access modules 110 are based on access module processors (AMPs) used in some TERADATA® database systems from NCR Corporation.

The parsing engine 108 in the database software 102 includes a parser that receives queries (e.g., SQL queries), including queries to perform clustering actions. The queries can be received from another program over some type of connection or through an established session (such as from a client station 12 to the database system 10). A selected access or query plan for each received query contains steps that are to be performed by the access modules 110. In response to these steps, the access modules 110 perform operations on data or data structures stored in the storage modules 114 in the storage subsystem 112. If the performance of clustering is desired, then the clustering module 100 cooperates with the access modules 110 to perform the clustering. Note that multiple instances of the clustering module 100 can be provided for respective multiple access modules 110.

K-means clustering, as performed by the clustering module 100, employs an input matrix (that contains the input data set), output matrices (that store the clustering results), and one or more intermediate matrices (to store information such as "sufficient statistics" for improving efficiency of the clustering). These matrices are represented generally as 115 in FIG. 1. In one implementation, the input matrix is a relational table while the remaining matrices are implemented as one-dimensional arrays or vectors (which can be implemented as binary files, in one example). The terms "one-dimensional array" and "vector" are used interchangeably.

In accordance with some embodiments of the invention, the matrices 115 have predetermined formats that improve efficiency of clustering operations and reduces storage size requirements for the memory 106. The matrices 115 are organized as blocks containing respective portions of a corresponding matrix. Clustering is performed by accessing these blocks by retrieving selected blocks from the persistent storage medium, in the form of the storage modules 114 or external storage modules, and storing the selected blocks in the memory 106. This process of retrieving matrix blocks from the persistent storage medium into the memory 106 is a process of caching the matrix blocks 106 in the memory 106. By caching selected blocks instead of entire matrices in the memory 106, usage of the memory 106 can be reduced while still allowing efficient clustering operation.

For enhanced storage and processing efficiency, only a portion (a block rather than the entirety) of each matrix is maintained in the memory 106. The block of a given matrix is replaced with another block as the clustering process proceeds and different parts of the clustering matrix are involved. The technique of storing just a portion of each matrix in the memory 106 is applicable to data mining and machine learning analyses as well.

According to some embodiments, each block for some of the matrices (such as the intermediate and result matrices for the clustering operation) according to predetermined formats stores either an entire row or column of a corresponding matrix. Selecting one of the row or column to store in each block of a particular matrix depends on the type of operations to be performed on the particular matrix (explained further below). The selection of either row or column to store in the matrix block is designed to allow an entire block to be cached in the memory 106 to reduce input/output (I/O) accesses of the persistent storage medium. In the ensuing discussion, reference to "I/O cycles" or "I/O accesses" refers to cycles or accesses relating to the persistent storage medium. Note that the access speed of the persistent storage medium (e.g., disks) can be much slower than the access speed of the memory 106, such that reduction of I/O cycles or I/O accesses with respect to the persistent storage medium is desirable.

The matrix manipulation techniques according to some embodiments for performing clustering (or other statistical analysis), data mining, or machine learning allows reduction of sizes of the memory 106 while still achieving efficiency in terms of reduced I/O accesses of the persistent storage medium. Reduced usage of the memory 106 allows a greater amount of the memory 106 to be used by other applications, programs, or users.

The vector format used for some of the matrices 115 allows vector entries to be indexed by corresponding addresses. The indexing of the entries of the vector allow for quicker access by the clustering module 100 of entries in each block that is accessed by the clustering module 100 to perform clustering.

The relational table format for storing the input data set reduces the processing that has to be performed to convert input data into a format useable by a clustering algorithm. For example, with conventional clustering algorithms, the input data set is usually in the plain file or table format, which necessitated conversion of relational tables containing the input data set into the plain file or table format before clustering can be performed. Such conversion is typically time consuming and inefficient. In contrast, the relational table format for the input data set useable by the clustering module 100 according to some embodiments avoids the need to convert to a plain file or table. Each block of the input matrix (that stores the input data set in relational form) for storing the content of the input data set has one row per dimension value per point.

II. Definitions of Data Structures for K-Means Clustering

The inputs to the K-means clustering module 100 are: (1) a data set D having n d-dimensional points, $D=\{x_1, x_2, \ldots, x_n\}$, and (2) k, the desired number of clusters. Each $x_i$, $i=1, \ldots, n$, is a point in the data set D. Note that D is a data set having dimensions n×d. A d-dimensional point refers to an array having d dimensions. The d dimensions of a point correspond to d attributes that describe a particular event (e.g., a visit to purchase items in a grocery store, where the items are the attributes).

The output of the K-means clustering module 100 includes three matrices: C (containing the means or probability of occurrence of each dimension in each cluster), R (containing squared distances), and W (containing the weights for each cluster). The output produced by the clustering module 100 also includes a partition of D into k subsets and a measure of cluster quality. Matrices C and R are d×k matrices and matrix W is a k×1 matrix. The W matrix thus includes k weights, the C matrix includes k means, and the R matrix includes k variances. Each of the d rows of the C matrix contains k entries, where each entry j (j=1, . . . , k) contains a value indicating the probability of occurrence of the corresponding dimension l (l=1, . . . , d) in the cluster j.

In the following discussion, for manipulating matrices, the following convention for subscripts is used. When referring to transactions or points, the variable i is used, where $i \in \{1, 2, \ldots, n\}$. For cluster number, the variable j is used, where $j \in \{1, 2, \ldots, k\}$. Also, reference is made to variable l, where $l \in \{1, 2, \ldots, d\}$. $D_1, D_2, \ldots, D_k$ refer to the k subsets of the data set D induced by clusters such that $D_j \cap D_{j'} = \emptyset$ for $j \neq j'$. The data set D is "hard partitioned" into subsets $D_1, D_2, \ldots, D_k$. Hard partitioning refers to partitioning points such that each point is assigned to only one cluster. To refer to a column of C or R, the j subscript (e.g., $C_j$, $R_j$) is used. $C_j$ and $R_j$ refer to the jth cluster centroid and jth variance matrix, respectively, and $W_j$ is the jth cluster weight.

III. K-Means Clustering Algorithm

Formally, the problem of clustering is defined as partitioning D into k subsets (clusters) such that $$\sum_{i=1}^{n} d(x_i, C_j) \quad \text{(Eq. 1)}$$

is minimized, where $d(x_i, C_j)$ indicates the distance from point $x_i$ to $C_j$, and where $C_j$ is the nearest cluster centroid of $x_i$. The distance from input point $x_i$ to $C_j$ (jth cluster centroid) is $$d(x_i, C_j) = (x_i - C_j)^T (x_i - C_j). \quad \text{(Eq. 2)}$$

The quality of a clustering model is measured by the sum of squared distances from each point to the cluster where the point was assigned. This quantity is proportional to the average quantization error, also known as distortion. The quality of a solution is measured as:

$$q(C) = \frac{1}{n} \sum_{i=1}^{n} d(x_i, C_j), \quad \text{(Eq. 3)}$$

where $x_i \in D_j$.

Figure 2:
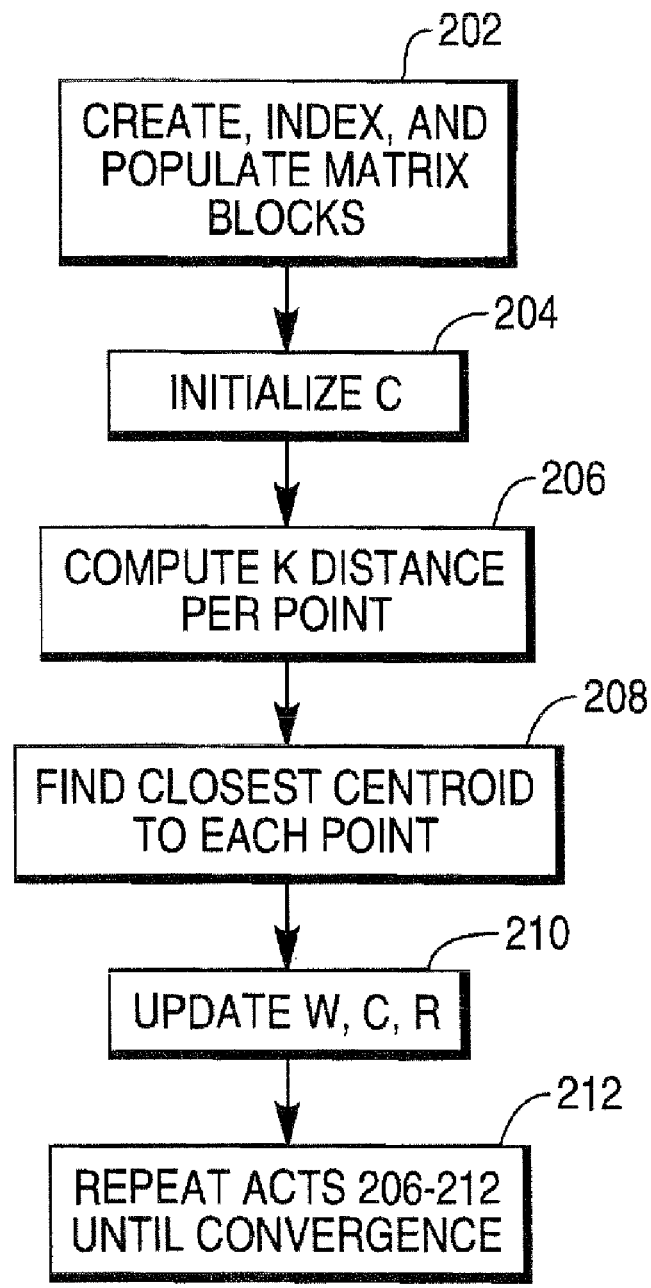
FIG. 2 is a flow diagram of a process of clustering a data set according to an embodiment in the database system of FIG. 1.

FIG. 2 illustrates generally the tasks involved in performing K-means clustering according to some embodiments. The tasks can be performed by the clustering module 100 or by the clustering module 100 in combination with other modules. Initially, matrix blocks according to predetermined formats are created, indexed, and populated (at 202). The matrix blocks include blocks for storing content of the input data set, intermediate matrices associated with sufficient statistics (described further below), and the output C, R, and W matrices.

The centroids $C_j$ and variance matrices $R_j$ are initialized (at 204). Initializing the centroids allows multiple iterations of the clustering computations to be performed to converge to a solution. Each iteration assigns each point to its nearest cluster and then points belonging to the same cluster are averaged to get new cluster centroids. Each iteration successively improves cluster centroids until they become stable.

The clustering algorithm computes (at 206) k distances for each data point $x_i$. The K-means clustering algorithm calculates Euclidean distances (Eq. 2 above) to enable the finding of the nearest centroids to each input point.

Using the computed distances, the clustering algorithm then finds (at 208) the closest centroid $C_j$ to each data point $x_i$. Finding the closest centroid for each data point effectively determines the nearest cluster for each data point so that the data point can be added to that nearest cluster. Cluster membership is determined in this manner so that the data set D can be partitioned into k subsets (corresponding to the k clusters).

The clustering algorithm then updates (at 210) the W, C, and R matrices. All centroids $C_j$ are updated by averaging points belonging to the same cluster. The k cluster weights $W_j$ and the k diagonal variance matrices $R_j$ are updated based on the updated $C_j$ centroids. Note that updating the W, C, and R matrices uses sufficient statistics for improved clustering efficiency, in accordance with some embodiments.

Three matrices N, M, Q are used to store sufficient statistics. Matrix N has dimensions k×1, and matrices M and Q have dimensions d×k. N stores the number of points, $M_j$ stores the sum of points, and $Q_j$ stores the sum of squared points in cluster j, respectively. The values $N_j$, $M_j$, and $Q_j$ are calculated as follows:

$$N_j = |D_j|, M_j = \Sigma_{x_i \in D_j} x_i, \text{ and } Q_j = \Sigma_{x_i \in D_j} x_i x_i^T,$$

where $D_j$ represents the set of points in cluster j. Based on these three equations, the matrices W, C, R are computed as $$C_j = M_j/N_j, R_j = Q_j/N_j - M_j M_j^T/N_j^2, W_j = N_j/\Sigma_{J=1}^{k} N_j.$$

The tasks 202-210 are repeated (at 212) until the K-means solution converges. In other words, the K-means algorithm stops when q(C) (see Eq. 3 above) changes by less than or equal to a marginal fraction ($\epsilon$), a predefined value, in consecutive iterations. Alternatively, a maximum number of iterations can be set to avoid long runs.

In the flow of FIG. 2, tasks 206 and 208 are part of an "E step," and task 210 is part of an "M step." Pseudocode according to an example embodiment for performing tasks in the flow of FIG. 2 is depicted in FIG. 3. Note that the pseudocode depicts one example of how clustering according to an embodiment can be implemented. In other implementations, other flows can be used.

In FIG. 3, the Initialize( ) routine (300) performs the initialization task (204 in FIG. 2), the Estep( )(302) routine performs the E step (tasks 206 and 208 in FIG. 2), and the Mstep( ) routine (304) performs the M step (task 210 in FIG. 2). The algorithm sets initial values of C in Initialize( ) based on μ (the global mean) and Σ (global standard deviation or global convariance). Σ can also be considered to be the squared radius (spatial size) of the cloud representing the input data set. The Initialize( ) routine computes μ and Σ if they are not already pre-assigned. The values of μ and Σ, calculated based on the entire data set, are used to initialize C and R in one example implementation. Intuitively, all centroids can be initialized close to the global center (global mean) of the entire data set. Similarly, the variance matrices R can be initialized to the global standard deviation value.

Global statistics μ and Σ are computed once per data set, stored on the persistent storage medium, and retrieved in each run thereafter. The Initialize( ) routine also precomputes Δ (used for distance computation for sparse input matrices as discussed further below) and determines d (the number of dimensions). Based on the precomputed values, memory is dynamically allocated for storing the blocks of the various matrices.

Iterations of the Estep( ) and Mstep( ) routines 302, 304 are invoked by a WHILE loop 306 in the pseudocode of FIG. 3. In the WHILE loop 306, the parameter MAXITERS specifies the maximum number of iterations to be performed by the clustering module 100 (FIG. 1) when converging to a solution. The equation $q^{[I]}-q^{[I-1]} \geq \epsilon$ specifies the difference between the quality of the solution in iteration I ($q^{[I]}$ computed according to Eq. 3) and the solution quality in previous iteration I–1 ($q^{[I-1]}$) being less than or equal to the predefined value $\epsilon$.

In the WHILE loop 306, the E step is executed n times per iteration I, and the M step is executed at the end of each iteration I. Note that the E step is effectively executed once per data point, and the M step is executed once per iteration. In other words, the M step is performed much fewer times than the E step.

The Estep( ) routine 302 computes the k distances $\delta(x_i, C_j, R_j)$, represented as $d(x_i, C_j)$ in Eq. 2 above, for every point $x_i$ and updates sufficient statistics matrices M, Q, N based on the closest cluster index m. The Estep( ) routine 302 invokes readRow(D) to input a row of D into $x_{li}$. The read(C,l) and read(R,l) routines invoked by the Estep( ) routine 302 read entries of C and R, respectively, into matrix blocks Cblock and Rblock, respectively. Generally, invocation of the read (MATRIX, ii) routine reads the iith row or column of MATRIX (e.g., the C or R matrix) to store in the respective matrix block. As noted above, the matrix blocks Cblock and Rblock have predetermined formats to enhance clustering efficiency and reduced memory usage. The matrix blocks are retrieved into the memory 106 for computing the distance $$\delta_j = \delta_j + (x_{li} - Cblock_j)^2 - Cblock_j^2,$$

where $x_{li}$ is a dimension value in the input matrix D, and $Cblock_j$ refers to cluster centroid j. The value of δ was initialized to $\Delta_j$ (δ←Δ task in the Estep( ) routine 302) for sparse matrix calculation. Sparse matrix calculation enhances efficiency for input data sets that are sparse. A sparse data set refers to a data set having data points with dimensions having zero values. Sparse matrix calculation refers to a technique where distance computations for zero-value dimensions are more efficiently handled.

When D has many entries equal to zero and the number of dimensions d is relatively high, computing Euclidean distances can be relatively expensive in terms of resource utilization. Often, only a few dimensions of a transaction database have non-zero values. To enhance efficiency of clustering for a database having many zero values, a distance from every $C_j$ to the null vector $\overline{0}$ is precomputed. The following k-dimensional vector is defined: $\Delta_j = \delta(\overline{0}, C_j)$. The Euclidean distance is then calculated as $\delta(x_i, C_j) = \Delta_j + \Sigma_{l+1, x_{lj} \neq 0}{}^d ((x_{li} - C_{lj})^2 - C_{lj}^2)$ (which is performed in the Estep( ) routine).

The pseudocode of FIG. 3 is able to efficiently process a sparse input data set D. If D is a non-sparse matrix, that is, D has d rows per point, then the E step visits all d blocks from C and R. As discussed further below, each block of the input data set stores one row per dimension value per point. Thus, if each point of the input data set has all non-zero dimension values, then there will be d rows per block for the input data set D. However, if D is a sparse matrix, then sparse matrix computation is used.

Note that if there are a large number of dimensions in an input data set, then it is likely that most dimensions will have zero value in the data points. Also, sparse matrix computation is applicable to any statistical analysis, data mining, or machine learning technique in which a subset of all dimensions of a data set is accessed. In this case, the subset of dimensions can be used as indexes to access entries of a specific block.

Efficiency is enhanced by updating sufficient matrix M and Q blocks (cached in the memory 106 of FIG. 1) in a sparse manner (discussed further below). Since K-means produces a hard partition, only one block from M and Q needs to be updated. This block is the one corresponding to the closest cluster m. The following portion of the pseudocode of FIG. 3 performs the update of the N, M, and Q matrices.

Let m be s·t $\delta_m \leq \delta_j$, j=1, . . . , k
$N_m = N_m + 1$
Mblock←read(M,m)
Mblock←Mblock+$x_i$, write(Mblock, M, m)
Qblock←read(Q,m)
Qblock←Qblock+$x_i x_i^l$, write(Qblock, Q, m)
write({i, m}, P)

In the pseudocode portion above, the closest centroid to the data point being considered is cluster m. Thus, only portions of the matrices N, M, and Q corresponding to the closest cluster m is updated. Entry $N_m$ is updated by incrementing it by one. Column m is read from matrix M and input into Mblock (retrieved into memory 106). The cached version of Mblock (in memory 106) is updated and written back to the $m^{th}$ column of the matrix M on the persistent storage medium, by invoking the routine write(Mblock, M, m). Generally, the write(BLOCK, MATRIX, ii) routine causes matrix block (BLOCK) to be written back to the matrix (MATRIX) at column or row ii.

Similarly, the $m^{th}$ column of Q is read into Qblock (which is retrieved into the memory 106), which is then updated. The updated content of Qblock is then written back to the $m^{th}$ column of the matrix Q on the persistent storage medium, by invoking write(Qblock, Q, m).

For sparse data sets, the updates of M and Q are performed in a sparse manner. In sparse matrix updates, only values corresponding to non-zero dimensions of a data point are used to update M and Q. In other words, when updating the M or Q block stored in the memory 106, indexes that correspond to the non-zero dimensions are used to select entries in the M or Q block for updating.

Note that the flow of the Estep( ) routine discussed above can be applied to data mining, machine learning, or other statistical analysis techniques. The following discussion regarding updating table P and the details of the Mstep( ) routine are applicable to K-means clustering.

Finally, a relational table P is written to make the partition explicit, by invoking the routine write({i, m}, P)). The table P identifies which points belong to which cluster.

The Mstep( ) routine 304, shown in FIG. 3, updates C, R, W based on M, Q, N and computes $\Delta_j$ (for use in the E step for sparse distance computation). The pseudocode is organized to take M and Q as input and C and R as output. Since C, R have a transposed organization with respect to M, Q, (discussed in next sub-section) dk (d multiplied by k) I/O cycles are employed. For the M step, j is iterated from 1 to k (in the outer FOR loop), and the $j^{th}$ column of M, Q are read into Mblock, Qblock, respectively, for each iteration.

An inner FOR loop iterates l from 1 to d, with the $l^{th}$ row of each of C, R read into Cblock, Rblock, respectively. Cblock and Rblock are updated in the memory 106, and written back to C, R on the persistent storage medium by invoking routines write(Cblock, C, 1) and write(Rblock, R, 1), respectively. Wblock$_j$ is also updated in memory 106. The next task of the M step is flushing W to the persistent storage medium, by invoking write(Wblock, W, 1).

Note that only one entry of C and R, out of k entries, is updated per I/O cycle. Alternatively, the M step can be modified by reading/writing C, R d times and reading M, Q dk times. Updating Δ is a memory-only operation.

IV. Improved Data Layout or Format

The following discusses the improved layout and format that enables improved efficiency and reduced usage of the memory 106 when performing clustering or other data mining operations. As discussed above, the input data set matrix D has a predetermined relational form, where each row of the matrix D contains only the value for one dimension of one point when such value is non-zero. FIG. 4 shows an example D matrix 400, along with corresponding example C and W blocks 402, 404. By storing only non-zero values, storage efficiency is enhanced when the input data set D has many zero values, such as a transaction data set.

The schema (definition) for D is D(PID, l, value), where PID is the point identifier, l is the dimension subscript and value is the corresponding non-zero value. In the example of FIG. 4, the first row of D contains an entry for dimension 1 of point 1, which has value "5"; the fifth row of D contains an entry for dimension 2 of point 2, which has value "2." When D has exactly dn rows (which means there are no zero dimension values), D is referred to as a non-sparse matrix; otherwise, when D has less rows, D is called a sparse matrix. If D is sparse, D will have in total td rows, where t is the average of $s(x_i)$, and $s(x_i)$ represents the number of non-zero dimensions for $x_i$. The number t can be thought of as average transaction size. In practice, the D table may have an index, but in some implementations, the index will not be required since D is read sequentially. The primary key of D is simply (PID,l). This representation becomes particularly useful when D is a sparse matrix, but the representation is still adequate for any data set.

In FIG. 4, the input matrix D is divided into four blocks, where each block has length b (depending upon the number of non-zero dimension values).

As mentioned above, K-means clustering produces a hard partition of D into k subsets $D_1, D_2, \ldots, D_k$. Each $x_i$ is assigned to one cluster and such assignment is stored in the table P(PID,j). P, which is also a relational table like the matrix D, contains the partition of D into k subsets. Each subset $D_j$ can be selected using j to indicate the desired cluster number. This P table is used for output only and its I/O cost is relatively low since it is written n times during the last scan (in the M step) and each row of P is relatively small. Note that disk seeks (positioning the file pointer at a specific disk address inside the file) are not needed for D and P because they are accessed sequentially. Also, I/O accesses may be buffered reading a group of D rows or writing a group of P rows.

The organizations of intermediate matrices (sufficient matrices N, M, Q) and output matrices (C, R, W matrices) on the persistent storage medium is discussed below. The organizations of these matrices are not strictly relational as is the case for tables D and P. In one implementation, each matrix is stored in a binary file (in vector form) storing its rows or columns as blocks of floating point numbers. The position of a block within the file is used to locate the desired block during the clustering operation. Thus, in the example of FIG. 4, the C matrix block has three blocks (corresponding to the three dimensions of the input table D), with each block having k (number of clusters) values (length k).

Accessing entries in memory-based matrices involves computing their memory address based on matrix sizes. I/O for matrices is minimized because a group or matrix entries are read/written as a single block of information. Each block is used and accessed as a one-dimensional array to locate a specific entry. Each block is directly accessed with one seek and one I/O to read or write the block.

The organization of each matrix involved in a clustering operation according to some embodiments is summarized in Table 1 below:

TABLE 1

| Matrix | Content | Index | No. of Blocks | Block Length | Memory | Disk |
| --- | --- | --- | --- | --- | --- | --- |
| D | Input points | PID, l | dn/b or tn/b | b | b x 16 | dn x 16 |
| P | Partition | PID, m | n/b | b | b x 12 | n x 12 |
| C | Centroids | L | d | k | k x 8 | dk x 8 |
| R | Variances | L | d | k | K x 8 | dk x 8 |
| W | Weights | — | 1 | k | k x 8 | k x 8 |
| M | Suff. Stats | J | k | d | d x 8 | kd x 8 |
| Q | Suff. Stats | J | k | d | d x 8 | kd x 8 |
| N | $|D_j|$ | — | 1 | k | k x 8 | k x 8 |

Each of the C matrix and R matrix has d blocks, each of length k. Each of the M matrix and Q matrix has k blocks each Of length d. Note that the C, R matrices are transposed with respect to the M, Q matrices. Note that the C block and R block store a respective row of the C matrix and R matrix, while the M block and Q block store a respective column of the M matrix and Q matrix, respectively.

Each of the W matrix and N matrix has one block of length k. The D matrix has dn/b (or tn/b if sparse) blocks each of length b. The P matrix has n/b blocks each of length b.

In the example above, the "Memory" column represents the storage space used in the memory 106 by each block for the corresponding matrix, and the "Disk" column represents the storage space used in the persistent storage medium by each block for the corresponding matrix. For example, for the C matrix (associated with d blocks each of length k), the memory size to store each block is k×8 bytes, and the persistent storage medium size to store all blocks of the C matrix is dk×8 bytes. The value 8 (and other values 12 and 16 listed in Table 1) are provided for the purpose of example only. Other values are applicable in other implementations (e.g., use of simple versus double precision numbers, 64-bit versus 32-bit architecture, etc.).

In the E step, C is read for every point $x_i$ to compute $\delta(x_i, C_j, R_j)$. If D is a sparse matrix, then most dimensions in C, R will not be needed to compute δ. But in any case, all k distances must be computed at each E step. This motivates storing C, R with all k values for each cluster as one block for each dimension. Each block for C, R is accessed using the dimension l as an index. If there are $s(x_i)$ rows for $x_i$ then only $s(x_i)$ blocks from C and R are read. When $s(x_i)$<d this reduces the number of I/O cycles.

As mentioned above, Δ is used to store precomputed distances. This auxiliary matrix is small and therefore is kept in memory. Once the k distances $\delta(x_i, C_j, R_j)$ are computed, $x_i$ is added to the closest cluster based on sufficient statistics values. The clustering module has to read and write only information about one cluster from M and Q. This motivates storing all d dimensions of one cluster as one block and using the cluster index j as index.

Let m be the index of the closest cluster. When $x_i$ is added to $M_m$, the clustering module reads $M_m$ from the persistent storage medium, adds $x_i$ to $M_m$, and then writes $M_m$ back to the persistent storage medium. A similar reasoning motivates organizing Q in the same manner as M. Note that effectively one point is used to update one row or column of the M or Q matrix. So only two I/O cycles are needed to update M and two I/O cycles are needed to update Q per E step. Since N is a small matrix, it is kept in the memory 106 as one block of k values. To assign $x_i$ to $D_m$, representing the closest cluster, the clustering module just needs to write its PID and m to P in a single I/O cycle.

Similar techniques are applied to assign data points in a decision tree, or to assign points by a classifier in one of plural categories.

By writing C, R, W to the persistent storage medium at every M step, the following benefit is provided: the algorithm can be stopped at any time. So if there is an I/O error while scanning D or the algorithm is simply interrupted by the user, the latest results are available on the persistent storage medium. Even further, the exact values of C, R, W could be obtained up to the last read point by reading M, Q, N, which are updated in every E step.

The read/write operations on the input data set D and all matrices are summarized in Table 2.

TABLE 2

| Matrix | E Step Usage | E Step I/Os | M Step Usage | M Step I/Os |
|---|---|---|---|---|
| D | r | t or d | — | 0 |
| P | w | 1 | — | 0 |
| C | r | t or d | w | 2 dk |
| R | r | t | w | 2 dk |
| W | — | 0 | w | 1 |
| M | rw | 2 | r | k |
| Q | rw | 2 | r | k |
| N | — | 0 | — | 0 |

The data set D is read in the E step. Since each row corresponds to one dimension, t I/O cycles are used on average per E step if D is sparse and d otherwise. Also, when cluster membership has been determined, P is updated during the subsequent scan to produce the hard partition. Matrices D and P are not accessed in the M step. The matrices C, R are read in the E step. Each access requires one seek and one I/O cycle to read the blocks with k values. In the M step, since M and Q are transposed with respect to C and R, 2dk seeks and I/O cycles are used per M step to update C and R, respectively. Note that this is expensive compared to the E step (however, the M step occurs much less frequently than the E step).

V. Alternative Distance Computation

As noted above, computation of Euclidean distances (Eq. 2) is performed in a K-means clustering algorithm according to some embodiments. Alternatively, Mahalanobis distance computation instead of Euclidean distance computation is performed using the global covariance matrix $\Sigma$. Euclidean distance is a particular case of the following formula when $\Sigma=I$, where I is the d×d identity matrix. In this case, the $\Sigma$ symbol represents a diagonal matrix, not a summation. The Mahalanobis distance from point $x_i$ to the $j^{th}$ centroid is computed as:

$$\delta(x_i, C_j, \Sigma) = (x_i - C_j)' \Sigma^{-1} (x_i - C_j). \quad \text{(Eq. 4)}$$

The Mahalanobis distance formula can be easily evaluated when $\Sigma$ is diagonal as follows (assuming dimensions are independent): $\delta(x_i, C_j, \Sigma) = \Sigma_{l=1}^{d}((x_{li} - C_{lj})^2)/\Sigma_l$.

This change in distance computation also changes the clustering problem itself. Given this change in distance computation, the quantization error on each dimension is divided by the corresponding dimension variance:

$$q(R, W) = \sum_{j=1}^{k} W_j \sum_{l=1}^{d} \frac{R_{lj}}{\Sigma_l}. \quad \text{(Eq. 5)}$$

The net effect of these computations is that the K-means clustering algorithm is effectively working on a data set with unit variance. To avoid the practical issue of dividing by zero when dimension l has zero variance, $\Sigma_l$ is set to 1; if $\Sigma_l=0$, then $\Sigma_l \leftarrow 1$. This does not affect results since distances on dimension l are zero. While this changes the clustering problem, it does not affect the basic properties of the K-means algorithm. These computations are equivalent to scaling each dimension by one standard deviation (dividing each dimension l of $y_i$ by $\sqrt{\Sigma_l}$).

For sparse input data sets, the computation of $\Delta$ is modified from the computation discussed above for Euclidean distances if the K-means clustering algorithm uses Mahalanobis distance computation. In the latter case, $$\Delta_j = \delta(\overline{0}, C_j, \Sigma). \quad \text{(Eq. 6)}$$

Then $$\delta(x_i, C_j, \Sigma) = \Delta_j + \sum_{l=1, kl \neq 0}^{d} (1/\Sigma_l)((x_{li} - C_{lj})^2 - C_{lj}^2). \quad \text{(Eq. 7)}$$

In alternative embodiments, the Mahalanobis distance computation technique can be substituted for the Euclidean distance computation technique in performance of the improved clustering algorithm based on matrix manipulation discussed above. Use of the Mahalanobis distance computation allows the clustering algorithm (or data mining/machine learning algorithm) to avoid data pre-processing, which further enhances efficiency.

Instructions of the various software routines or modules discussed herein (such as the database software 102, which includes the clustering module 100, access modules 110, and parsing engine 108, and so forth) are executed on corresponding CPUs. The CPUs include microprocessors, microcontrollers, processor modules or subsystems (including one or more microprocessors or microcontrollers), or other control or computing devices. As used here, a "controller" refers to hardware, software, or a combination thereof. A "controller" can refer to a single component or to plural components (whether software or hardware).

Data and instructions (of the various software routines or modules) are stored on one or more machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

The instructions of the software routines or modules are loaded or transported to a system in one of many different ways. For example, code segments including instructions stored on floppy disks, CD or DVD media, a hard disk, or transported through a network interface card, modem, or other interface device are loaded into the system and executed as corresponding software modules or layers. In the loading or transport process, data signals that are embodied in carrier waves (transmitted over telephone lines, network lines, wireless links, cables, and the like) communicate the code segments, including instructions, to the system. Such carrier waves are in the form of electrical, optical, acoustical, electromagnetic, or other types of signals.

While the present invention has been described with respect to a limited number of embodiments, those skilled in the art, having the benefit of this disclosure, will appreciate numerous modifications and variations there from. It is intended that the appended claims cover all such modifications and variations as fall within the true spirit and scope of this present invention.

What is claimed is:

1. A method of performing data analysis with respect to a data set having a plurality of data points in a database system, each of the data points having a first number of attributes, the method comprising:
    storing a first matrix involved in the data analysis as plural blocks, the blocks stored on a persistent storage medium of the database system, the first matrix containing an output corresponding to clustering performed by the data analysis to produce a second number of clusters, wherein the plural blocks for the first matrix comprise the first number of blocks each having a length equal to the second number;
    retrieving one of the blocks of the first matrix from the persistent storage medium to a memory;
    computing plural distances for a particular one of the data points in the data set using the retrieved one of the blocks in the memory; and
    storing a second matrix containing sufficient statistics as plural blocks, the plural blocks for the second matrix comprising the second number of blocks each having a length equal to the first number; and
    updating content of the first matrix blocks using the second matrix blocks.

2. The method of claim 1, wherein storing the first matrix as the first number of blocks comprises storing the first matrix in one-dimensional arrays, each array indexed by a predefined index.

3. The method of claim 1, further comprising:
    performing plural iterations of the data analysis to converge to a solution for the first matrix; and
    updating the second matrix blocks in the memory in each of the plural iterations.

4. The method of claim 3, wherein updating each second matrix block comprises performing a sparse update of each second matrix block in which only entries of the second matrix block corresponding to non-zero values of dimensions of a respective data point are updated.

5. The method of claim 1, wherein the first matrix is part of a first set of matrices that contain outputs for the clustering, and wherein the second matrix is part of a second set of matrices containing the sufficient statistics.

6. The method of claim 1, further comprising storing the data set as a sparse data set in an input matrix that contains zero values for some dimensions of data points in the data set.

7. The method of claim 6 further comprising:
    computing distances of cluster centroids to a null vector; and
    using the distances of the cluster centroids to the null vector to compute distances of data points to cluster centroids.

8. The method of claim 1, further comprising updating content of the second matrix blocks by:
    reading blocks of the second matrix into the memory;
    updating the blocks of the second matrix in the memory; and
    writing the updated blocks to the second matrix stored on the persistent storage medium.

9. The method of claim 1, wherein computing the plural distances comprises computing one of Euclidean distances and Mahalanobis distances.

10. The method of claim 1, wherein the data analysis comprises K-means clustering, the method further comprising computing outputs of the K-means clustering based on the computed distances.

11. A method of performing data analysis with respect to a data set having a plurality of data points in a database system, each of the data points having a first number of attributes, the method comprising:
    storing a first matrix involved in the data analysis as plural blocks, the blocks stored on a persistent storage medium of the database system, the first matrix containing an output corresponding to clustering performed by the data analysis to produce a second number of clusters, wherein the plural blocks for the first matrix comprise the first number of blocks each having a length equal to the second number;
    retrieving one of the blocks of the first matrix from the persistent storage medium to a memory;
    computing plural distances for a particular one of the data points in the data set using the retrieved one of the blocks in the memory;
    storing a second matrix containing sufficient statistics as plural blocks, the plural blocks for the second matrix comprising the second number of blocks each having a length equal to the first number, and
    updating content of the first matrix blocks using the second matrix blocks,
    wherein storing the first matrix comprises storing a C matrix containing values indicating probability of occurrence of each attribute of the data points in each cluster, and
    wherein storing the second matrix comprises storing an M matrix that stores sums of data points.

12. The method of claim 11, wherein the first number is represented as d, and the second number is represented as k, the method further comprising:
    storing an R matrix organized as d blocks each having a block length of k, the R matrix containing squared distances of data points to clusters; and
    storing a Q matrix organized as k blocks each having a block length of d, the Q matrix containing sums of squared data points.

13. An article comprising at least one non-transitory storage medium containing instructions that when executed cause a system to:
    store, on a persistent storage medium, at least first and second matrices involved in a K-means clustering of a data set in predetermined blocks, wherein the first matrix contains output of the K-means clustering, and the second matrix contains sufficient statistics, wherein the blocks for the first matrix contain respective rows of the first matrix, and wherein the blocks for the second matrix contain respective columns of the second matrix, the data set having a plurality of data points each having attributes 1 to d, and the K-means clustering producing clusters 1 to k, wherein the first matrix is organized as d blocks each of length k, and the second matrix is organized as k blocks each of length d; and compute results for the K-means clustering using the blocks of the first and second matrices retrieved from the persistent storage medium to a memory.

14. The article of claim 13, wherein the first matrix is part of a first set of matrices containing output of the K-means clustering.

15. The article of claim 14, wherein the second matrix is part of a second set of matrices containing sufficient statistics, and wherein the instructions when executed cause the system to update the first set of matrices with the second set of matrices.

16. The article of claim 13, wherein the instructions when executed cause the system to further:

retrieve one of the blocks of the first matrix from the persistent storage medium into the memory; and compute plural distances for a data point in the data set using the retrieved one of the blocks in the memory.

17. The article of claim 13, wherein each block of the first matrix is a one-dimensional array indexed by a predefined index, wherein the instructions when executed cause the system to access entries of the retrieved one of the blocks in the memory using the predefined index.

18. The article of claim 16, wherein the instructions when executed cause the system to further:

retrieve one of the blocks of the second matrix from the persistent storage into the memory; and update a block of the first matrix using the retrieved block of the second matrix, wherein the update of the block of the first matrix is performed in the memory.

19. The article of claim 18, wherein d is different from k.

20. A database system comprising:

a persistent storage medium to store a data set having a plurality of data points each having a first number of attributes, wherein K-means clustering is to be performed on the data set to produce a second number of clusters, the persistent storage medium to further store a first matrix containing output of the K-means clustering to be performed on a data set, and a second matrix containing sufficient statistics, wherein the first matrix is organized with the first number of blocks each of length equal to the second number, and the second matrix is organized with the second number of blocks each of length equal to the first number;

a memory; and a controller to:

retrieve a block of each of the first and second matrices into the memory; and update the block of each of the first and second matrices in the memory.

21. The database system of claim 20, wherein each block is a one-dimensional array indexed by a predefined index.

22. The database system of claim 21, wherein the data set is stored in a relational table having a format different from the one-dimensional arrays of the matrices.

23. The database system of claim 20, wherein the blocks of the matrix contain one of sums of the data points; and squared sums of the data points.

* * * * *